United States Patent [19]

Matsumoto

[11] Patent Number: 4,904,136
[45] Date of Patent: Feb. 27, 1990

[54] THREAD SECURING DEVICE USING ADHESIVE
[75] Inventor: Osamu Matsumoto, Hyogo, Japan
[73] Assignee: Mitsubishi Denki Kabushiki Kaisha, Tokyo, Japan
[21] Appl. No.: 137,911
[22] Filed: Dec. 28, 1987
[30] Foreign Application Priority Data
Dec. 26, 1986 [JP] Japan .................. 61-314216
[51] Int. Cl.⁴ .................. F16B 39/02; F16B 39/22
[52] U.S. Cl. .................. 411/82; 411/301; 411/366
[58] Field of Search .................. 411/23, 69, 82, 258, 411/301, 302, 308, 366, 436, 423

[56] References Cited
U.S. PATENT DOCUMENTS
1,497,952  6/1924  Smith .................. 411/423 X
2,145,168  1/1939  Flagg .................. 411/423 X
2,255,384  9/1941  Hood .................. 411/436 X FOREIGN PATENT DOCUMENTS
2063927  7/1972  Fed. Rep. of Germany ...... 411/258
2325623  12/1974  Fed. Rep. of Germany ........ 411/82
2041135  9/1980  United Kingdom ................ 411/308

Primary Examiner—Neill R. Wilson
Attorney, Agent, or Firm—Sughrue, Mion, Zinn, Macpeak & Seas

[57] ABSTRACT

A securing device is disclosed in which a cylindrical member having a male thread provided on the outside circumferential surface and to which an adhesive is applied is screw-engaged in the tapped hole of another member from the entrance of the hole so that the cylindrical member is secured in a prescribed position inside the other member, wherein the inside diameter of the female thread of the tapped hole is made larger in the portion of the female member from the entrance of the hole to the prescribed position than in the prescribed position of the female member.

2 Claims, 2 Drawing Sheets

THREAD SECURING DEVICE USING ADHESIVE

BACKGROUND OF THE INVENTION

The present invention relates to a securing device in which a cylindrical member is screw-engaged in a tapped hole at the deep portion thereof so as to be secured.

A conventional securing device, in which a cylindrical member is screw-engaged in a tapped hole and spirally moved to a prescribed position in the tapped hole so as to be secured to perform an aimed fixing function, has been used in various fields. Before the cylindrical member is screw-engaged in the tapped hole, an adhesive or the like is applied to the male screw of the cylindrical member to secure the cylindrical member to the female screw of the tapped hole firmly, liquid-tightly or gas-tightly. However, the adhesive or the like applied to the male screw of the cylindrical member comes off the male screw before the cylindrical member is spirally moved to the prescribed position in the tapped hole, so that the amount of the adhesive or the like is not sufficient when the cylindrical member is placed in the prescribed position. Although it is good to apply the adhesive or the like to the inside surface of the tapped hole in the prescribed position in order to prevent the adhesive or the like from coming off the male screw, it is also troublesome. This is a problem.

SUMMARY OF THE INVENTION

The present invention was made in order to solve the above-mentioned problem.

Accordingly, it is an object of the present invention to provide a securing device in which a necessary amount of an adhesive is retained on the male screw of a cylindrical member even if the adhesive is applied to the male screw and the cylindrical member is then spirally moved to a prescribed position.

In the securing device, the height of the thread of the female screw of a tapped hole is made slightly smaller in the portion of the tapped hole from the entrance thereof to the prescribed position than in the other portion of the tapped hole so that the inside diameter of the female screw is larger in the former portion than in the latter portion in which the cylindrical member is located in the prescribed position after being spirally moved. Since the thread of the female screw is not deeply engaged in the trough of the male screw until the cylindrical member is spirally moved to the prescribed position, the adhesive is mostly retained in the trough of the male screw until the cylindrical member is spirally moved to the prescribed position. When the cylindrical member is spirally moved to the prescribed position, the opening between the thread of the female screw and the trough of the male screw is reduced so that the opening is filled with the adhesive under pressure. The adhesive applied to the male screw of the cylindrical member is thus sufficiently brought to a prescribed depth of the tapped hole and filled in the opening between the male and the female screws.

DETAILED DESCRIPTION OF THE PREFERRED EMBODIMENT

An embodiment of the present invention is hereafter described with reference to the drawings.

Figure 1:
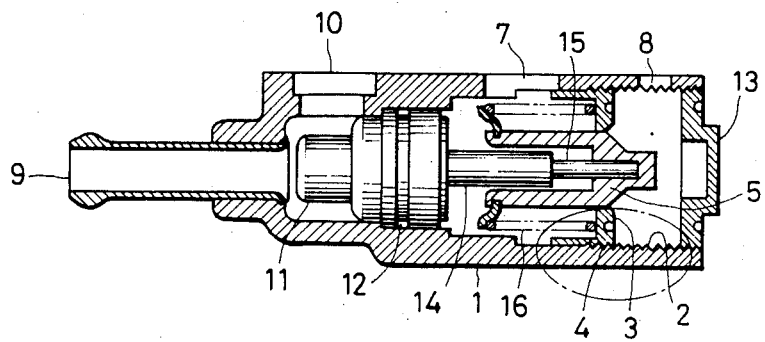
FIG. 1 shows a sectional view of an auxiliary air quantity control valve to which a securing device which is an embodiment of the present invention is applied.
Figure 2:
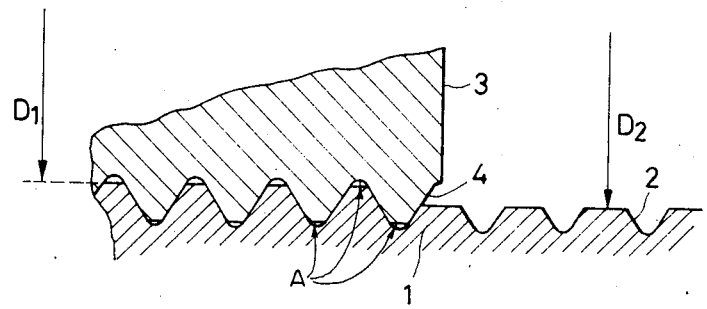
FIG. 2 shows an enlarged view of a part surrounded by an ellipse shown in FIG. 1.

FIG. 1 shows a sectional view of an auxiliary air quantity control valve to which a securing device which is the embodiment is applied. FIG. 2 shows an enlarged view of a part surrounded by an ellipse shown in FIG. 1. Shown in the drawings are a first member 1 which is a valve casing, a female screw 2 provided on the inside circumferential surface of the tapped hole of the first member and extending from the entrance of the tapped hole through a prescribed position, a second member 3 which is a valve seat having a valve port, a male screw 4 provided on the outside circumferential surface of the second member, the conventional inside diameter $D_1$ of the female screw, and the inside diameter $D_2$ of the female screw, which is increased in the portion of the female screw from the entrance of the tapped hole to the prescribed position by slightly cutting or truncating the thread of the female screw.

In the auxiliary air quantity control valve shown in FIG. 1, a valve element 5 cooperates with the valve port of the valve seat 3 to regulate the flow rate of auxiliary air as the air flows in and out through the air inlet and outlet ports 7 and 8 of the valve casing 1. The auxiliary air quantity control valve is attached to a throttle body (which is not shown in the drawings) so that the air inlet port 7 and the air outlet port 8 are located to by-pass a throttle valve (which is not shown in the drawings) in an intake passage not shown in the drawings. The valve casing 1 has an inlet and an outlet ports 9 and 10, through which the cooling water of an engine (which is not shown in the drawings) is caused to flow. The valve casing 1 is fitted with a thermosensitive member 11 container thermowax, which expands or contracts depending on the temperature of the cooling water flowing through the inlet and the outlet ports 9 and 10. The thermosensitive member 11 and an O-ring 12 separate a by-pass chamber and a cooling water passage chamber from each other. The thermosensitive member 11 comprises a cylinder 14 extending into the by-pass chamber, and a rod 15 slidably fitted in the cylinder. The valve element 5 is attached so that it is guided by the outside circumferential surface of the cylinder 14 and driven by the rod 15. A spring 16 is provided between the valve element 5 and the valve seat 3 and always pushes the rod 15. A cap 13 is screw-engaged and secured in the female screw 2 to close the entrance of the tapped hole of the valve casing 1.

Figure 3:
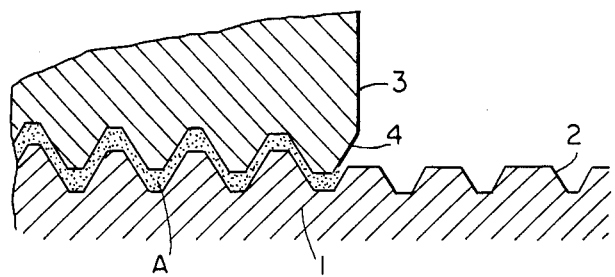
FIG. 3 shows an enlarged view of a part surrounded by an ellipse shown in FIG. 1, with adhesive A disposed between the valve seat and the casing.

Before the valve seat 3 is attached to the valve casing 1, an adhesive or the like is applied to a first thread of the male member and the valve seat is then screw-engaged in the second thread 2 of the female member and moved into the prescribed position shown in FIG. 1, through the use of a jig, in order to secure the valve seat in the prescribed position. Since the inside diameter of the second thread 2 of the female member is made larger in the portion thereof from the entrance of the tapped hole to the prescribed position than in the prescribed portion of the female screw as shown by $D_1$ and $D_2$ in FIG. 3, the adhesive A is retained in the trough of the first thread 4 and brought to the prescribed position more than in a conventional securing device. When the valve seat 3 is moved into the prescribed position at which the height of the second thread 2 of the female member is larger than in the other portion thereof (in other words, the inside diameter of the portion of the second thread in the prescribed position is smaller than in the other portion thereof as shown by $D_1$ and $D_2$ in FIG. 2), the opening between the trough of the first thread 4 and the second thread 2 of the female member is reduced so that the adhesive is sufficiently filled between the male and the female threads to enhance the power of adhesion and the degree of gas-tightness or liquid-tightness.

The adhesive or the like is also applied to the male thread of the cap 13 before the cap is screw-engaged in the female member of the valve casing 1 to close the entrance of the tapped hole thereof. The adhesive remains on the peripheral portion of the cap 13 to perform adhesion and hermetic sealing.

For example, the adhesive is an acrylic type of epoxy type of a highly-reactive securing agent made of specially processed microcapsules, some of which contain a sealing substance and the others of which contain a sticking substance so that a polymerizing reaction is started when the microcapsules are ruptured. However, it will be understood that the application of the present invention is not confined to such a kind of adhesive.

I claim:

1. A securing device in which a cylindrical male member having a first thread provided on the outside circumferential surface of said male member and to which an adhesive is applied is screw-engaged into a second thread in a tapped hole of a female member from the entrance of said hole so that said cylindrical male member is secured in a prescribed position inside said female member, wherein said second thread has a series of thread turns having a larger equal inner diameter in the portion of said female member from the entrance of said hole to said prescribed position than in the prescribed position having inner thread turns of a smaller diameter.

2. A securing device comprising:
   a cylindrical male member having a first thread provided on the outside circumferential surface of said male member;
   adhesive applied to said first thread; and
   a female member having a tapped hole into which said cylindrical male member is screw-engaged;
   wherein said tapped hole has a second thread projecting inwardly, and wherein a series of thread turns of said second thread from the entrance of said hole to a prescribed position along the axis of said hole are equally truncated so that said series of thread turns have the same inner diameter, and
   wherein a remainder of thread turns of said second thread starting at said prescribed position have a smaller inner diameter than said series of thread turns.

* * * * *